United States Patent
Walter et al.

(10) Patent No.: US 10,599,117 B2
(45) Date of Patent: Mar. 24, 2020

(54) SAFETY-ORIENTED AUTOMATION SYSTEM

(71) Applicant: Siemens Aktiengesellschaft, Munich (DE)

(72) Inventors: Maximilian Walter, Nuremberg (DE); Herbert Barthel, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 40 days.

(21) Appl. No.: 15/948,454

(22) Filed: Apr. 9, 2018

(65) Prior Publication Data

US 2018/0292796 A1  Oct. 11, 2018

(30) Foreign Application Priority Data

Apr. 10, 2017  (EP) ..................... 17165756

(51) Int. Cl.
*G05B 19/048* (2006.01)
*G05B 9/02* (2006.01)

(52) U.S. Cl.
CPC ............. *G05B 19/048* (2013.01); *G05B 9/02* (2013.01); *G05B 2219/24024* (2013.01); *G05B 2219/25006* (2013.01)

(58) Field of Classification Search
CPC ................... G05B 19/048; G05B 2219/25006
See application file for complete search history.

(56) References Cited

U.S. PATENT DOCUMENTS

| | | | | |
|---|---|---|---|---|
| 6,014,612 A | * | 1/2000 | Larson | G06F 11/22 700/11 |
| 2004/0158713 A1 | | 8/2004 | Aneweer et al. | |
| 2009/0105849 A1 | | 4/2009 | Glanzer et al. | |
| 2014/0179338 A1 | * | 6/2014 | Shang | H04W 4/023 455/456.1 |
| 2015/0185311 A1 | * | 7/2015 | Lohier | G06F 21/88 367/118 |
| 2015/0229654 A1 | | 8/2015 | Perier | |

FOREIGN PATENT DOCUMENTS

| | | |
|---|---|---|
| DE | 102013003166 | 8/2014 |
| EP | 1933497 | 6/2008 |

* cited by examiner

*Primary Examiner* — Farley Abad
(74) *Attorney, Agent, or Firm* — Cozen O'Connor

(57) ABSTRACT

A safety-oriented automation system in which additional point-to-point-communications links are installed in addition to the field bus so as to increase functional safety in an automation system.

10 Claims, 2 Drawing Sheets

SAFETY-ORIENTED AUTOMATION SYSTEM

BACKGROUND OF THE INVENTION

1. Field of the Invention

The invention relates to an automation system comprising a field bus with at least three coupling points that are configured such that an automatic coupling and uncoupling of automation devices to/from the field bus is possible, where the respectively coupled automation devices are configured to establish functionally safe connections between themselves via the field bus, and where the functional safety achieved thereby serves to prevent dangerous malfunctions due to errors.

In the context of the invention, functional safety means the safety for a part of an automation system that is dependent on correct functioning of safety-related systems and external facilities for minimizing risk. Functional safety exists if every risk is safeguarded against by way of safety functions such that a machine or an associated automation system respectively can be described as safe. In such a case the term safety-oriented automation systems is used.

2. Description of the Related Art

Functional safety is needed, for example, in the case of a tool changer. For example, multiple robots operating in a production cell operate alternately with multiple tools (e.g. welding guns). Whenever a robot takes hold of a tool, a functionally safe connection is set up between the tool and the control facility that controls the robot. Tools that are used infrequently are shared by the robots and can consequently be employed interchangeably on different robots. A safe communications connection to the tool must only be set up to the control facility for the robot that is also precisely using the tool. The question of a physical separation does not arise because the control facilities for the robots need to communicate between themselves. Here, the coupling points can be represented by the flanges of the robots, for example.

DE 10 2013 003 166 A1 discloses a safety module for a field bus user and an automation system. Here, in order to define a safety-oriented identification address, a setting facility is arranged in a casing of a safety module. In this setting facility, for example, a DIL switch, an unambiguous identification address is set.

SUMMARY OF THE INVENTION

It is an object of the present invention to provide an automation system with a plug-in location-dependent set up of functionally safe field bus connections while, however, omitting a setting facility such as a DIL switch.

This and other objects and advantages are achieved in accordance with the invention by an automation system in which a point-to-point communications link is provided between at least a first coupling point and a second coupling point in addition to the field bus, with the result that for a first automation device capable of being coupled and uncoupled to/from the first coupling point and for a second automation device capable of being coupled and uncoupled to/from the second coupling point, a paired relationship is established between the automation devices capable of being coupled and uncoupled to/from the field bus, where the automation devices capable of being coupled and uncoupled each have a point-to-point communications endpoint, the endpoints being configured to establish, alongside the field bus communication, an additional point-to-point communication via the point-to-point communications link. Furthermore, at least one of the automation devices capable of being coupled and uncoupled has a test device that is configured so as to safely test, via the additional communication made possible by the additional point-to-point communications link, whether the desired functionally safe connection was established between the automation devices and whether the desired automation device is also located at the opposite end of the point-to-point-communications link and a functionally safe connection is not being set up erroneously to an automation device which is located at another coupling point which does not or fails to correspond to the paired relationship.

Put simply, in accordance with the invention an additional communications link is arranged between the automation devices alongside the field bus or alongside a field bus communications link respectively, with an additional plug connector being present for the automated coupling of the change device to the coupling point. Accordingly, an additional communications link, which in functional terms only allows "point-to-point" communication, could be added in the same cable of the field bus communications link and at the same plug. Using a point-to-point connection has the effect that there is no error scenario for that communications protocol in which a telegram sent by the sender can be received by any other recipient than the desired recipient. A point-to-point coupling of this type can be set up such that the first automation device is permitted to communicate safely with the second automation device via the plug-in connection provided at a time point X. The plug-in connection for the point-to-point communication provided at the time point X accordingly specifies which communications-related potential connection is permitted to come into being. The two automation devices can therefore safely test whether or not they are precisely actually connected to each other. Once this test has been effected a safe field bus connection can be used between the automation devices via the field bus.

In a further embodiment, four coupling points are provided and a second point-to-point communications link is provided between a third coupling point and a fourth coupling point in addition to the field bus, such that for an automation device capable of being coupled and uncoupled to/from the third coupling point and for an automation device capable of being coupled and uncoupled to/from the fourth coupling point, a further paired relationship is established between automation devices capable of being coupled and uncoupled to/from the field bus.

In a first embodiment the test device additionally includes a device for implementing a Challenge/Response method. A safe test of the existing communications connection between two automation devices capable of being coupled and uncoupled can then be performed with a Challenge/Response method. The first automation device then formulates, with the aid of the device for implementing the Challenge/Response method, a different inquiry (Challenge) at each time point which must be answered in a suitable manner (Response) by the second automation device or by the partner automation device in the paired relationship respectively as soon as the plug-in connection is established. For a newly established plug-in connection, the first automation device changes the inquiry. This ensures that the inquiry cannot be answered in an erroneous manner by a storage network component, such as a router, with the aid of an obsolete message.

In the case of the presently contemplated embodiment, the first point-to-point communications link and the second point-to-point communications link, and the corresponding point-to-point communications endpoints arranged in the automation devices are configured as a standardized I/O link point-to-point coupling.

In a second embodiment, the first point-to-point-communications link and the second point-to-point communications link, and the corresponding point-to-point communications endpoints arranged in the automation devices are configured as a functionally safe I/O link point-to-point coupling with a functionally safe protocol. For this, the point-to-point communications endpoints are additionally configured as functionally safe point-to-point communications endpoints.

It is furthermore advisable for the automation devices to have functionally safe field bus communications endpoints for the functionally safe communication.

Especially in reference to automation devices which are configured as tool changers, robot systems, or clamping frames, it is advantageous to assign the automation devices are to a handling and/or processing system and to configure at least one automation device as an exchangeable tool with a field bus user configured for activation of actuators on the tool.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an exemplary embodiment of the invention, showing the following in this regard, in which.

DETAILED DESCRIPTION OF THE EXEMPLARY EMBODIMENTS

Figure 1:
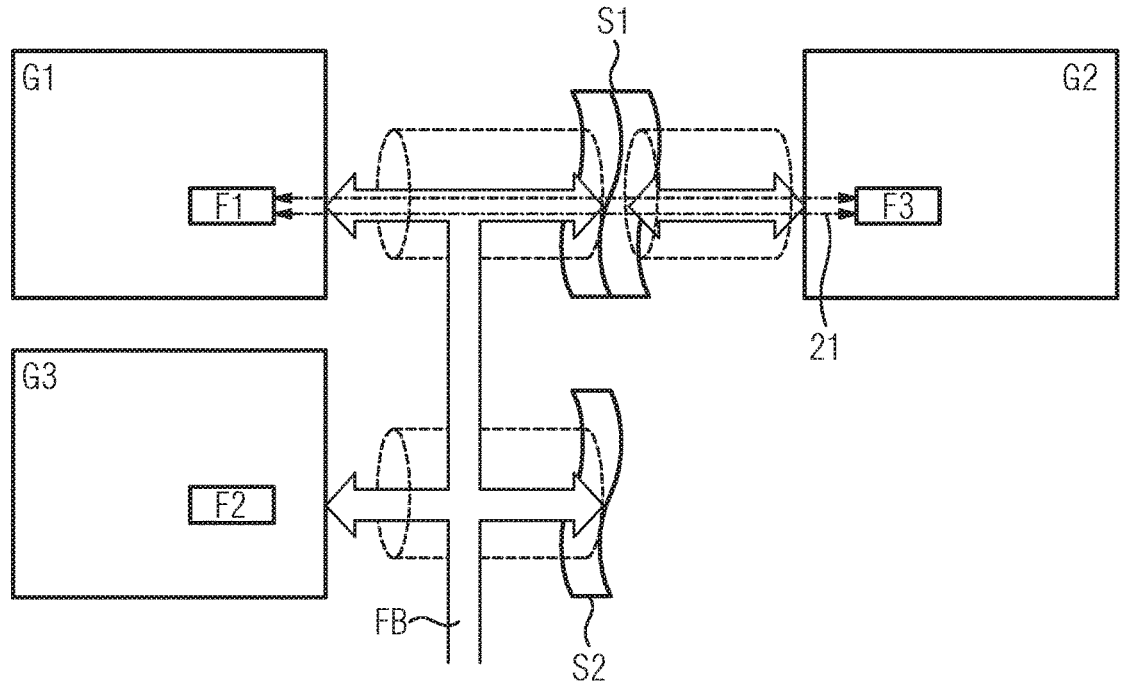
FIG. 1 shows a block diagram of an automation system with a field bus and coupling points in accordance with the art.

The fundamental problem with the construction of functionally safe connections between automation devices capable of being coupled and uncoupled is represented in FIG. 1. Let it be supposed that the communication between a first automation device G1 and a second automation device G2 or respectively between a third automation device G3 and the second automation device G2 is relevant for functional safety. For example, safe sensors and/or actuators can be located on the second automation device G2 that are intended to communicate via a safe channel with the first automation device G1 or the third automation device G3, respectively. The safe communication is also intended to be used to safely detect which devices are currently connected to each other. For example, the second automation device G2 is intended to be allowed to perform certain actions as long as it is connected to the first automation device G1. However, these same actions are intended to be prohibited for safety reasons if the second automation device G2 is connected to the third automation device G3.

Figure 2:
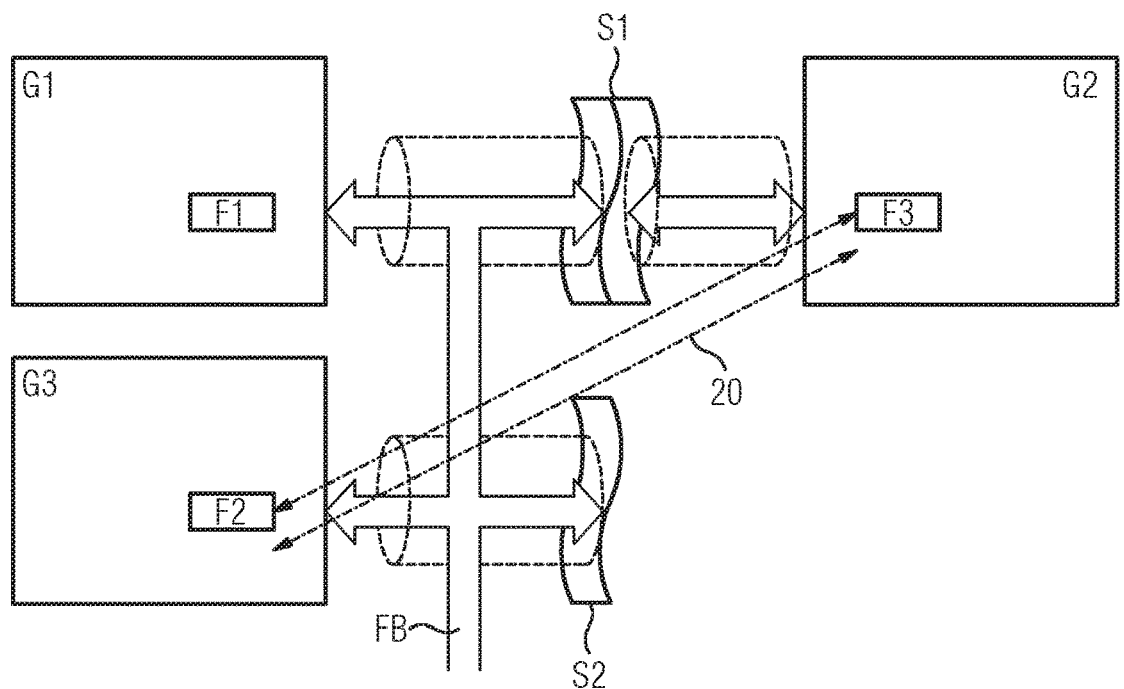
FIG. 2 shows the conventional automation system of FIG. 1 with a representation of an incorrect connection.

With respect to the safety of automation devices, the following exemplary problem arises: an error during use of the second automation device G2 by the automation devices G1, G3 needs to be detected with a high degree of probability for reasons of functional safety, and result in a safe condition. For example, an error could arise at the second automation device G2 that is connected to the first automation device G1 but due to an error a virtual connection is established between the third automation device G3 and the second automation device G2 (see FIG. 2). An incorrect connection 20 has been erroneously established between the third automation device G3 and the second automation device G2. A mechanism in common use up to now for detecting incorrectly set up connections or for detecting addressing errors is the use of unambiguous identifiers for the individual connections in the safe communications layer (e.g., "codename" in the case of Profisafe). In the present case, however, the identifier "codename" does not offer the required error detection that is desirable for the case shown in a field bus used in a functionally safe communications layer (as in the functionally safe communications layers represented in International Electrotechnical Commission (IEC) standard 61874-3X n). This is because the identifier "codename" in the second automation device G2 can be visible from both the other automation devices G1, G3 even if the automation devices are not coupled to the associated coupling points. What is wanted therefore is a solution that safely detects the establishment of an incorrect connection and manages with a single identifier or "codename" respectively (which can also be used interchangeably) for the connection.

Figure 3:
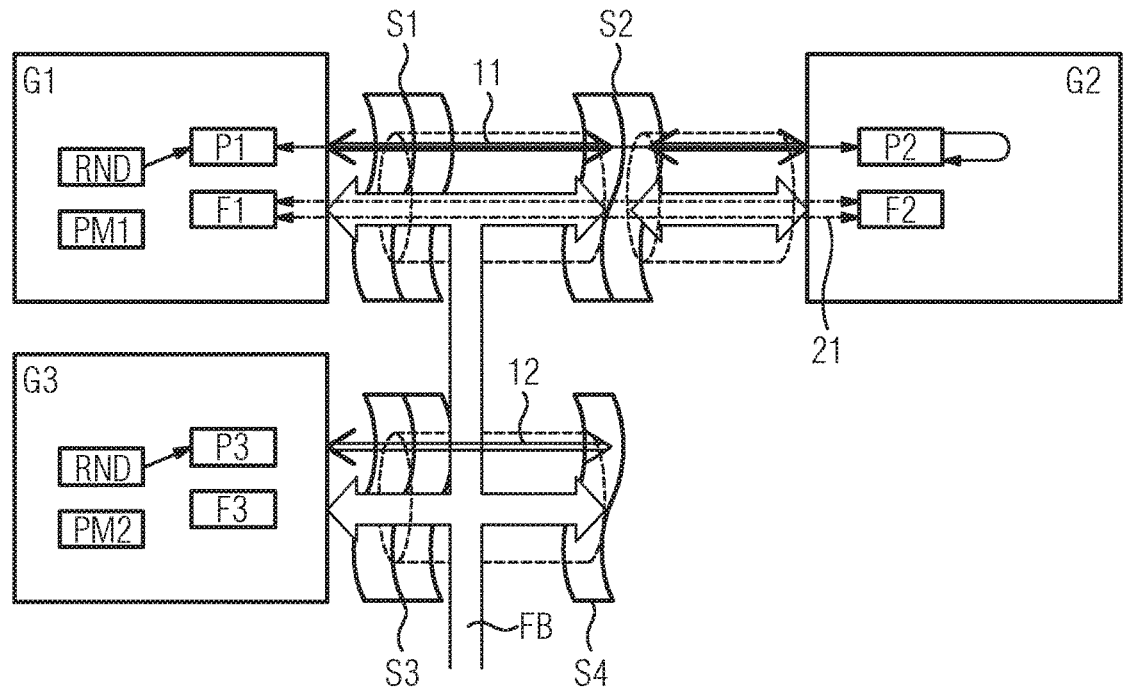
FIG. 3 shows an automation system with additional point-to-point communications links in accordance with the invention.

FIG. 3 shows an automation system 1 with a field bus FB in accordance with the invention. The first automation device G1 has a first coupling point S1 assigned to it and the second automation device G2 a second coupling point S2. At the second coupling point S2, the second automation device G2 is docked such that it can establish both a communications connection to the field bus FB and also a communications connection to a first point-to-point communications link 11 installed between the first automation device G1 and the first coupling point S1 or the second coupling point S2, respectively, in addition to the field bus FB. A point-to-point-communications link 11 is accordingly present between the first coupling point S1 and the second coupling point S2 in addition to the field bus FB, such that for a first automation device G1 capable of being coupled and uncoupled to/from the first coupling point S1 and for a second automation device G2 capable of being coupled and uncoupled to/from the second coupling point S2, a paired relationship is established between automation devices G1, G2 capable of being coupled and uncoupled to/from the field bus FB.

For the purpose of safely detecting the presence of an automation device G2 at the fourth coupling point S4, the third coupling point S3 has a second point-to-point communications link 12 in addition to the field bus FB. This second point-to-point communications link 12 leads from the third coupling point S3 with a plug connector to the fourth coupling point S4.

If the second automation device G2 is then coupled to the second coupling point S2, then a second point-to-point communications endpoint P2 located in the second automation device G2 can connect via the additional point-to-point communications link 11 to a first point-to-point communications endpoint P1 arranged in the first automation device G1. A first test device PM1 is configured to test safely, by using the additional communication via the first point-to-point-communications link 11, whether the second automation device G2 is connected to the second coupling point S2 assigned to the first automation device G1.

The third automation device G3 also has a second test device PM2 that is configured to safely test whether the second automation device G2 is connected to the fourth coupling point S4. The second point-to-point-communications link 12 is used for the safe testing.

In the exemplary embodiment of FIG. 3, the test devices PM1, PM2 furthermore have a device for implementing a Challenge/Response method. An exemplary Challenge/Response method consists in using a sufficiently unambiguous numerical value in the first automation device G1 and in the third automation device G3 (e.g., generating an N-bit random value). A random number generator (RND) is available for this. The random number generated is notified to the second automation device G2 via the additionally introduced first point-to-point communications link 11. The second automation device G2 modifies the random value in a previously defined manner (e.g. bit-by-bit inversion or multiplication by an uneven N-bit constant) and sends the result back. If the first automation device G1 or the third automation device G3 respectively receives the anticipated return value, then the conclusion can be drawn that a mechanical connection is established to the second automation device G2. Safety-related data can then be exchanged by way of the functionally safe connection of the first automation device G1 to the second automation device G2 via the field bus FB. A first functionally safe field bus communications endpoint F1 and a second functionally safe field bus communications endpoint F2 are available for this respectively in the first automation device G1 and in the second automation device G2. With the second functionally safe field bus communications endpoint F2, the second automation device G2 has the corresponding counterpart for a functionally safe communication via the field bus FB. By using the aforesaid functionally safe field bus communications endpoints F1, F2, F3, a functionally safe communication 21 can then be conducted between the two automation devices G1 and G2.

Figure 4:
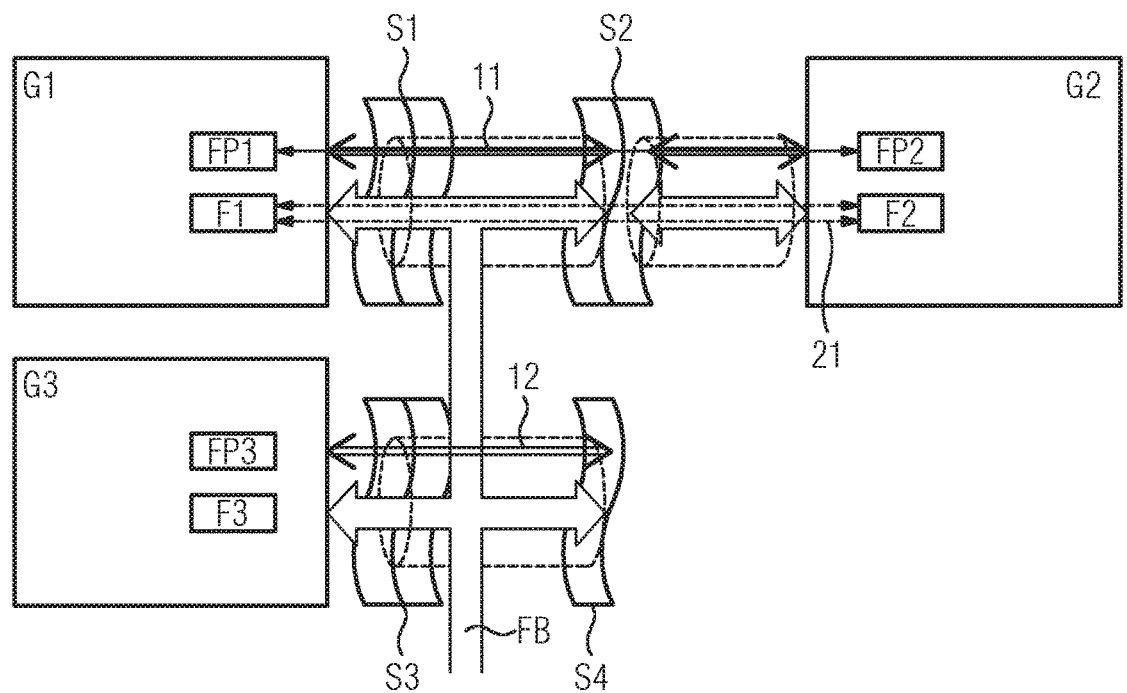
FIG. 4 shows an automation system with additional point-to-point communications links while using a functionally safe point-to-point coupling in accordance with the invention.

FIG. 4 shows an embodiment in which a functionally safe point-to-point communication is employed for the point-to-point communication. A functionally safe point-to-point communication can be achieved, for example, via a functionally safe I/O link point-to-point coupling with a functionally safe protocol. For the purpose of this functionally safe point-to-point communication, the first automation device G1 has a first functionally safe point-to-point communications endpoint FP1 and the second automation device G1 a second functionally safe point-to-point communications endpoint FP2. Correspondingly, the third automation device G3 has a third functionally safe point-to-point communications endpoint FP3. For the purpose of a functionally safe additional communication between the first automation device G1 and the second automation device G2, the additional functionally safe point-to-point communications endpoints FP1 and FP2 are used for the communication via the first point-to-point-communications link 11.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An automation system comprising:
a field bus having at least three coupling points which are configured to provide an automatic coupling and uncoupling of a plurality of automation devices to/from the field bus, respectively coupled automation devices of the plurality of automation devices being configured to establish functionally safe connections between themselves via the field bus, and functional safety being achieved thereby preventing dangerous malfunctions due to errors; and
a point-to-point communications link arranged between at least a first coupling point and a second coupling point in addition to the field bus, such that for a first automation device of the plurality of automation devices which is capable of being coupled and uncoupled to/from the first coupling point and for a second automation device of the plurality of automation devices which is capable of being coupled and uncoupled to/from the second coupling point, a paired relationship is present between the first and second automation devices of the plurality of automation devices which are capable of being coupled and uncoupled to/from the field bus, the first and second automation devices of the plurality of automation devices which are capable of being coupled and uncoupled each have a point-to-point communications endpoint, said endpoints being configured to establish, alongside the field bus communication, an additional point-to-point communication via the point-to-point communications link, and furthermore at least one automation device selected from the first and second automation devices of the plurality of automation devices capable of being coupled and uncoupled has a test device which is configured to safely test, via an additional communication made possible by the additional point-to-point communications link, whether a desired functionally safe connection was established between the first and second automation devices of the plurality of automation devices and whether one of the first and second automation devices of the plurality of automation devices forms a desired automation device located at an opposite end of the point-to-point communications link and a functionally safe connection is not being erroneously established to an automation device which is located at another coupling point which fails to correspond to the paired relationship.

2. The automation system as claimed in claim 1, wherein four coupling points are present and a second point-to-point communications link is present between a third coupling point and a fourth coupling point in addition to the field bus such that, for an automation device of the of the plurality of automation devices capable of being coupled and uncoupled to/from the third coupling point and for an automation device of the plurality of automation devices capable of being coupled and uncoupled to/from the fourth coupling point, a further paired relationship is present between the plurality of automation devices capable of being coupled and uncoupled to/from the field bus.

3. The automation system as claimed in claim 2, wherein the test device includes a device for implementing a Challenge/Response method.

4. The automation system as claimed in claim 2, wherein the first point-to-point communications link and the second point-to-point communications link, and corresponding point-to-point communications endpoints arranged in the plurality of automation devices are configured as a standardized I/O link point-to-point coupling.

5. The automation system as claimed in claim 2, wherein the first point-to-point communications link and the second point-to-point communications link, and corresponding point-to-point communications endpoints arranged in the plurality of automation devices are configured as a standardized I/O link point-to-point coupling.

6. The automation system as claimed in claim 2, wherein the first point-to-point communications link and the second point-to-point communications link, and the corresponding point-to-point communications endpoints arranged in the plurality of automation devices are configured as a functionally safe I/O link point-to-point coupling with a functionally safe protocol.

7. The automation system as claimed in claim 1, wherein the test device includes a device for implementing a Challenge/Response method.

8. The automation system as claimed in claim 7, wherein the first point-to-point communications link and the second point-to-point communications link, and the corresponding point-to-point communications endpoints arranged in the plurality of automation devices are configured as a functionally safe I/O link point-to-point coupling with a functionally safe protocol.

9. The automation system as claimed in claim 1, wherein the plurality of automation devices have functionally safe field bus communications endpoints.

10. The automation system as claimed in claim 1, wherein the plurality of automation devices are assigned to at least one of (i) a handling system and (ii) a processing system; and wherein at least one automation device is configured as an exchangeable tool with a field bus user configured for activation of actuators on the tool.

* * * * *